(12) United States Patent
Monk

(10) Patent No.: US 10,049,363 B2
(45) Date of Patent: Aug. 14, 2018

(54) PASSENGER BEHAVIOR RATING FOR IMPROVED RISK MANAGEMENT IN TRANSIT SYSTEMS

(71) Applicant: Cubic Corporation, San Diego, CA (US)

(72) Inventor: Paul Monk, Horley (GB)

(73) Assignee: CUBIC CORPORATION, San Diego, CA (US)

( * ) Notice: Subject to any disclaimer, the term of this patent is extended or adjusted under 35 U.S.C. 154(b) by 31 days.

(21) Appl. No.: 14/610,097

(22) Filed: Jan. 30, 2015

(65) Prior Publication Data

US 2015/0220929 A1     Aug. 6, 2015

Related U.S. Application Data

(60) Provisional application No. 61/934,578, filed on Jan. 31, 2014.

(51) Int. Cl.
    *G07B 15/00*          (2011.01)
    *G06Q 20/40*          (2012.01)
    (Continued)

(52) U.S. Cl.
    CPC ......... *G06Q 20/4016* (2013.01); *G06Q 10/06* (2013.01); *G06Q 50/14* (2013.01); *G06Q 50/30* (2013.01)

(58) Field of Classification Search
    CPC ........ G06Q 20/40; G06Q 20/20; G06Q 20/04; G06Q 20/10; G06Q 20/341
(Continued)

(56) References Cited

U.S. PATENT DOCUMENTS 5,828,044 A * 10/1998 Jun et al. ....................... 235/380
8,181,867 B1 * 5/2012 Bierbaum ............ G06Q 20/322
                                                   235/375
(Continued)

FOREIGN PATENT DOCUMENTS

WO     2013/173581 A2    11/2013

OTHER PUBLICATIONS

"Card Payments Roadmap in the United States: How Will EMV Impact the Future Payments Infrastructure?", published by the Smart Card Alliance in 2012, pp. 1-15. (Year: 2012).*

(Continued)

*Primary Examiner* — Brian M Epstein
(74) *Attorney, Agent, or Firm* — Kilpatrick Townsend & Stockton

(57) ABSTRACT

A communication is received from a fare media which includes a token associated with a transit account and a risk score based on a usage history of the account which is indicative of a likelihood of default associated with the account. One or more positive or negative lists are received from a server. Positive lists include first account identifiers associated with accounts in good standing. Negative lists include account identifiers associated with accounts in poor standing. A determination whether the token is associated with an account represented by one of the first or one of the second account identifiers is made. A determination, based on the risk score or the determination of the association of the token is made whether to grant access to the transit system. Information related to the determination of whether to grant access is communicated to the server. Access is granted to the transit system.

10 Claims, 5 Drawing Sheets

(51) Int. Cl.
*G06Q 50/30* (2012.01)
*G06Q 10/06* (2012.01)
*G06Q 50/14* (2012.01)

(58) Field of Classification Search
USPC .................................. 705/13; 235/384, 380
See application file for complete search history.

(56) References Cited

U.S. PATENT DOCUMENTS

| 2007/0187491 | A1* | 8/2007 | Godwin ................. G06Q 20/12 235/380 |
| 2008/0140516 | A1* | 6/2008 | Silbernagl et al. ............. 705/13 |
| 2008/0179394 | A1* | 7/2008 | Dixon et al. ................. 235/380 |
| 2008/0203170 | A1* | 8/2008 | Hammad et al. ............. 235/492 |
| 2009/0119213 | A1* | 5/2009 | Hammad et al. ............. 705/44 |
| 2009/0171682 | A1* | 7/2009 | Dixon et al. ....................... 705/1 |
| 2010/0280958 | A1* | 11/2010 | Hasson ................. G06Q 20/40 705/75 |
| 2011/0000962 | A1* | 1/2011 | Chan ...................... G06Q 20/20 235/382 |
| 2011/0166936 | A1* | 7/2011 | Dixon et al. ................ 705/14.58 |
| 2011/0166997 | A1* | 7/2011 | Dixon et al. .................... 705/41 |
| 2012/0284175 | A1* | 11/2012 | Wilson ................... G06Q 20/10 705/39 |
| 2013/0173357 | A1 | 7/2013 | Lishak |
| 2015/0012434 | A1* | 1/2015 | Aabye ................. G06Q 20/401 705/44 |

OTHER PUBLICATIONS

U.S. Appl. No. 14/610,097, filed Jan. 30, 2015, First Action Interview Pilot Program Pre-Interview Communication dated Mar. 17, 2015, all pages.
International Search Report and Written Opinion dated Apr. 14, 2015 for PCT/US2015/013826, filed Jan. 30, 2015; all pages.
International Preliminary Report on Patentability dated Aug. 11, 2016 for International Application No. PCT/US2015/013826; all pages.

* cited by examiner

PASSENGER BEHAVIOR RATING FOR IMPROVED RISK MANAGEMENT IN TRANSIT SYSTEMS

CROSS-REFERENCES TO RELATED APPLICATIONS

This application claims priority to U.S. Provisional Patent Application No. 61/934,578 filed Jan. 31, 2014, entitled "PASSENGER BEHAVIOUR RATING FOR IMPROVED RISK MANAGEMENT IN TRANSIT SYSTEMS," the entire disclosure of which is hereby incorporated by reference, for all purposes, as if fully set forth herein.

BACKGROUND OF THE INVENTION

Many transit operators are moving to account-based schemes. Conventional account based systems use "tokens" which may take the form of a payment card, identification (ID) card, or similar, which contain just a reference to an account and no information relating to the permissions or value held in that account. In such account schemes, the decision logic to allow entry to the transit system and/or exit from the transit system is typically based on transient data received from a back office of the transit system. Such transient data may be in the form of positive or negative (accept/deny) lists. These lists are utilized for making a binary decision, such as a hard "go" or "no-go" decision. Any risk management within the transit system operations of conventional account-based schemes are maintained by keeping these lists accurate and up to date. However, when the fare media readers go offline, the lists can become outdated and the exposure to fraud may increase.

BRIEF SUMMARY OF THE INVENTION

Embodiments of the invention provide systems and methods for providing intelligent decision making at transit access points by including passenger behavior rating in the decision making process. The systems and methods described herein are able to characterize individuals based on observed behaviors and to generate a subsequent predicted likelihood of default. Additionally, by providing risk behaviors and a risk score to a fare media, the transit access systems are able to make low risk decisions even if the transit access readers are offline for any reason. By providing additional data to the decision making engines within the transit access systems, list updates are less frequently needed.

In one aspect, a method for providing access to a transit system using a fare access media reader is provided. The method may include receiving a communication from a fare media. The communication may include a token and a risk score received from a fare media. The token may be associated with a transit account. The risk score may be determined by a transit server based at least in part on a usage history of the transit account. The risk score may be indicative of a likelihood of default associated with the transit account. The method may also include receiving one or more lists from the transit server. The one or more lists may include a positive list, a negative list, or both. The positive list may include a first plurality of account identifiers associated with transit accounts in good standing. The negative list may include a second plurality of account identifiers associated with transit accounts in poor standing. The method may further include determining whether the token is associated with an account represented by one of the first plurality of account identifiers or one of the second plurality of account identifiers. A determination, based at least in part on the risk score or the determination of the association of the token, may be made as to whether to grant a user of the fare media access to the transit system. The method may also include communicating to the transit server information related to the determination of whether to grant access. The method may further include granting the user access to the transit system.

In another aspect, a non-transitory computer-readable medium having instructions embedded thereon for providing access to a transit system is provided. The instructions may include computer code for causing a computing device to receive a communication from a fare media. The communication may include a token and a risk score from a fare media. The token may be associated with a transit account. The risk score may be determined by a transit server based at least in part on a usage history of the transit account. The risk score may be indicative of a likelihood of fraud associated with the transit account. The instructions may also include computer code for causing a computing device to receive one or more lists from the transit server. The one or more lists may include a positive list, a negative list, or both. The positive list may include a first plurality of account identifiers associated with transit accounts in good standing. The negative list may include a second plurality of account identifiers associated with transit accounts in poor standing. The instructions may further include computer code for causing a computing device to determine whether the token is associated with an account represented by one of the first plurality of account identifiers or one of the second plurality of account identifiers and to determine, based at least in part on the risk score and the determination of the association of the token, whether to grant a user of the fare media access to the transit system. The instructions may also include computer code for causing a computing device to communicate information related to the determination of whether to grant access to the transit server and to grant the user access to the transit system.

In another aspect, a fare media reader is provided. The fare media reader may include a communications interface configured to send and receive data, a memory, and a processor. The processor may be configured to receive, using the communication interface, a communication from a fare media. The communication may include a token and a risk score from a fare media. The token may be associated with a transit account. The risk score may be determined by a transit server based at least in part on a usage history of the transit account. The risk score may be indicative of a likelihood of fraud associated with the transit account. The processor may also be configured to receive, using the communication interface, one or more lists from the transit server. The one or more lists may include a positive list, a negative list, or both. The positive list may include a first plurality of account identifiers associated with transit accounts in good standing. The negative list may include a second plurality of account identifiers associated with transit accounts in poor standing. The processor may be further configured to determine whether the token is associated with an account represented by one of the first plurality of account identifiers or one of the second plurality of account identifiers and to determine, based at least in part on the risk score and the determination of the association of the token, whether to grant a user of the fare media access to the transit system. The processor may be configured to communicate, using the communication interface, information related to the determination of whether to grant access to the transit server and to grant the user access to the transit system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
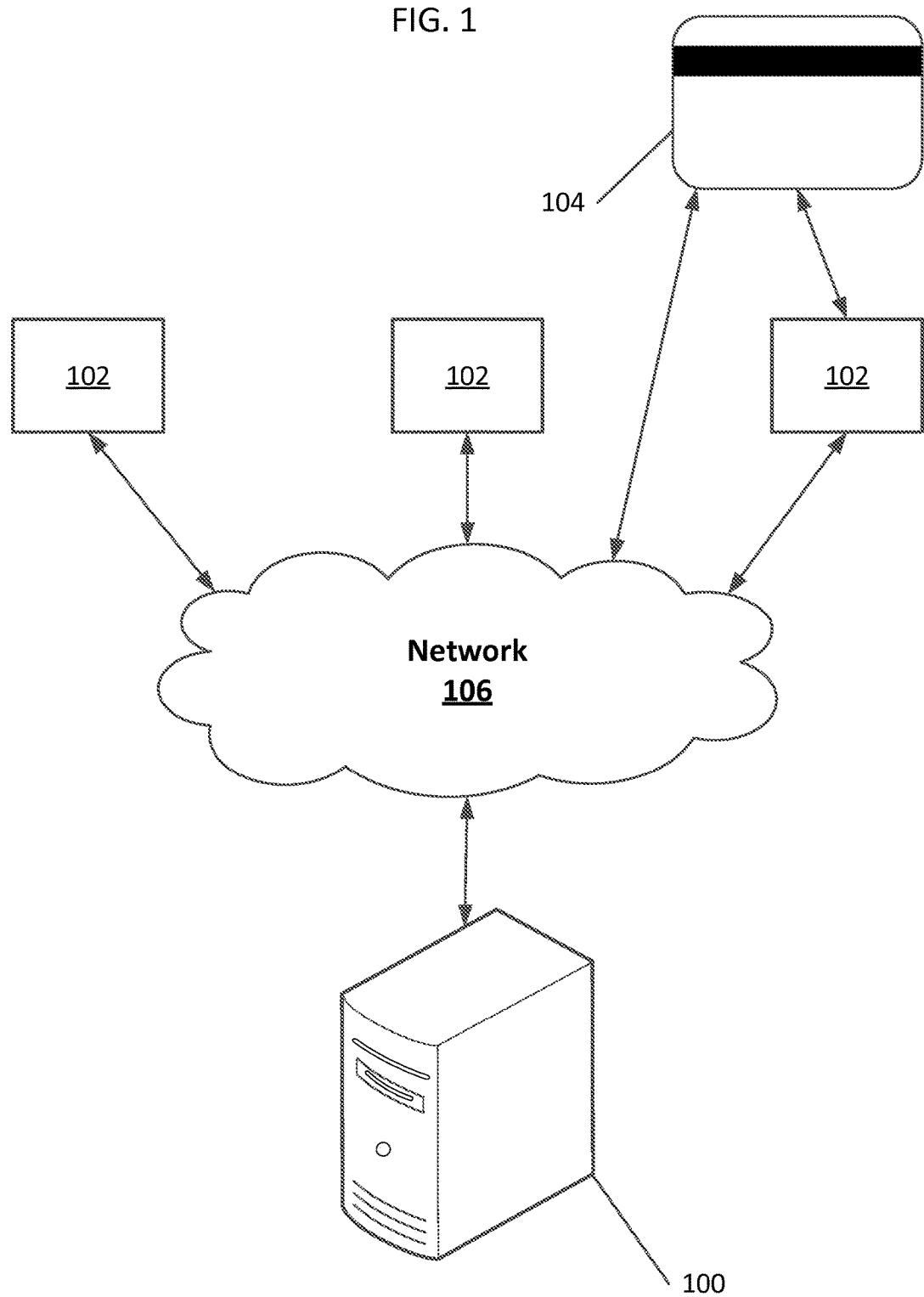
FIG. 1 is a system diagram depicting connections between fare access devices and a remote system over a network according to embodiments.

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the invention provide systems and methods for providing passenger behavior ratings in the decision making process. An individual's observed behaviors may be characterized to generate a subsequent predicted likelihood of default. Oftentimes, the risk scoring relates to longer term data trends and behavior, the risk scores may be considered more reliable than other transient data, such as the positive and negative lists. The risk scores may therefore significantly improve the risk management decisions taken by the fare access readers.

The systems and methods described herein expand processing done by a back office or transit server to include behavioral analysis of any transactions that have been recorded by the transit systems. This allows "fraud risk scoring" of individual passengers. Risk scoring may include assessing the usage and/or payment history of a transit account. For example, risk scoring may include how often a customer tops-up an e-purse, and the likelihood of the e-purse being negative at any one time. Risk scoring may also look at factors such as a customer's payment history, an account balance history, a duration of ownership of the transit account, repeated abnormal usage patterns, and/or fare inspector interactions. By looking at one or a combination of these or similar factors, a risk score may be generated that may be used during offline risk assessment processing within the fare media readers. Additionally, the risk score information may be used to supplement the use of positive and/or negative lists when the fare media readers are online. The risk scores generated by the back office or other server may be distributed to the readers to be recorded on the individual fare media and/or to be stored locally within the readers for later use. In some embodiments, the back office may communicate the risk score to the readers for transmission to the fare media, while in other embodiments the back office may communicate the risk scores directly to the fare media.

As one example, the risk score may be a numerical value, such as a number on a scale of 1-100 where lower numbers represent users at a higher risk of default. One or more threshold values may be used to set access rules for the transit system. For example, a first threshold, such as a risk score of at 60, may set a minimum score for allowing a user access to the transit system. A second threshold, such as a risk score of 90, may set a lower limit of risk scores that may be considered sufficiently low risk to override a denial by a token of the fare media being on a negative list. In some embodiments, a default risk score may be provided to the fare media based on the opening of a transit account and/or the first use of the fare media with the transit system. The default risk score may be set by the transit authority to reflect its choices on how much risk to accept in access decisions.

For example, the default risk score may be set below the first threshold until there is sufficient positive usage data such that the transit authority considers the fare media to present a low risk of default. In other embodiments, the default risk score may be set above one or more thresholds such that access may be granted unless the user of the fare media has one or more instances of failure to pay, fraud, and/or other negative behavior. The default risk score may be updated as the transit server receives payment and/or usage information from the fare media reader. Positive history, such as a user continually having sufficient funds, consistent payment history, a long history of using the transit account and/or the fare media, and/or other positive factors may be used to adjust the credit score upward. Negative history may be used to reduce the user's risk score. Negative history factors may include abnormal usage patterns, poor payment history, instances of insufficient funds, negative interactions with fare inspectors, and/or other negative behaviors. Interactions with a fare inspector may include when a user is caught attempting to ride for free, or when a user attempts to swipe in and/or out of the transit system between the endpoints of their travels to reduce the fare paid. If caught by a fare inspector, such practices may be reported to the transit server and used in the determination and generation of the risk score. The transit server may include rules that determine how many negative interactions with a fare inspector are needed to lower a risk score. For example, a transit system may give each user one free interaction, which may account for instances where a user innocently forgot to pay for the transit ride. Other systems may provide a zero tolerance policy and lower the risk score upon the first reported interaction. Outstanding transit fines as a result of failure to pay or other fraudulent behavior may also be collected by the transit server to use in generating and updating the risk score.

The transit authority may implement one or more rules that determine when to grant access to the transit system. The transit authority may change the rules over time to adjust to current risk management practices. The rules may include one or more thresholds to risk scores, and may also account for reasons why the risk scores have been adjusted. The rules may be in place both for transit media readers that are online with the transit server and those that are offline. When transit media readers are online, the rules may include entry limits for those users who have certain risk score values and/or reasons for the adjustment of the just score. These scores and reasons may be used to override a denial based on a token of the fare media being found on a negative list. For example, if a user has a very high risk score, such as a 95 out of 100, the transit authority may determine that the user presents a sufficiently low risk of defaulting that even if the user's transit account is on a negative list, the user may still be allowed access. A user with a risk score of 75 may not be deemed low enough risk to override the account matching one on a negative list. Such use of risk scores may complement the use of lists such that the transit system may allow more access without unduly increasing risk. When the fare media readers are offline, the lists may become out of date and less reliable. In such instances, the fare media readers may make the determination to allow entry to the transit system solely on the risk scores matching or exceeding predetermined thresholds. It will be appreciated that the above examples are merely a small subset of possible methods of implementations of risk scores and rules. Other scales, values, representations of risk scores, and/or other rules for transit system access may be implemented in accordance with the present disclosure.

Referring now to FIG. 1, a system diagram of one embodiment of connections between fare access devices and a remote system over a network 106 are shown. A transit server 100 may be in communication with one or more transit fare readers 102. In some embodiments, the transit server 100 may be remotely located relative to one or more of the transit fare readers 102. The connection between the transit server 100 and the transit fare readers 102 may be radio, WiFi, Bluetooth™, Local Area Network (LAN) or other public and/or private communication network. The transit server 100 may use the connection to communicate risk scores and/or one or more lists to the fare media readers 102. The risk scores and/or lists may be used in the decision making process at each of the transit fare readers 102 when determining whether to grant a user access to the transit system. This provides a real-time snapshot of the status of the account and a likelihood of default. Risk scores may be determined by a transit server based at least in part on a usage history of the transit account, and the risk score may be indicative of a likelihood of default associated with the transit account. The one or more lists may include one or more positive and/or negative lists. Positive lists include a first plurality of account identifiers associated with transit accounts in good standing, and negative lists include a second plurality of account identifiers associated with transit accounts in poor standing. The lists may be generated based on accept and/or deny records of the fare media and/or transit accounts presented to the fare access readers.

The fare media readers 102 may use the connection to communicate information received from a fare media 104 to the transit server 100. For example, a local or short-range connection protocol may be used, such as Bluetooth™ or near field communication (NFC) or other wireless communication protocol may be used to enable communication between a fare media and the transit fare reader 102. Fare media 104 may include transit cards, credit cards, mobile electronic devices, RFID tags, other NFC and/or Bluetooth™ enabled devices, and the like. A user 104 may position the fare media 104 within a communication range of a fare media reader 102 where the information from the card may be communicated to the transit fare reader 102. The information may include a token associated with a transit account and/or a risk score previously received and stored by the fare media 104. A token may be an alphanumeric or other series of characters that may be used to identify a transit account and/or a transit accountholder. The transit fare reader 102 may then use the token to look up whether the user's transit account is on one or more of the lists. If the token matches with an account on a positive list, the user may be granted access. If the token matches with an account on a negative list, the user may be denied access. The risk score may be used alternatively, or in conjunction with the lists, to determine whether to grant access. For example, a high risk score indicating reliability of a user to pay may override a token on a negative list such that the user is still granted access to the transit system. The risk scores may be especially useful if the transit fare reader 102 is offline and/or the lists are not up to date. In such cases, the risk score may be the sole information used in the determination of whether to grant access. For example, the transit system may go offline due to localized power outages, transit server maintenance, problems with the network 106 such as a general network outage, and the like. It will be appreciated that the components shown in FIG. 1 may be part of a larger, communicatively interconnected transit system, which may have multiple similar arrangements.

Figure 2:
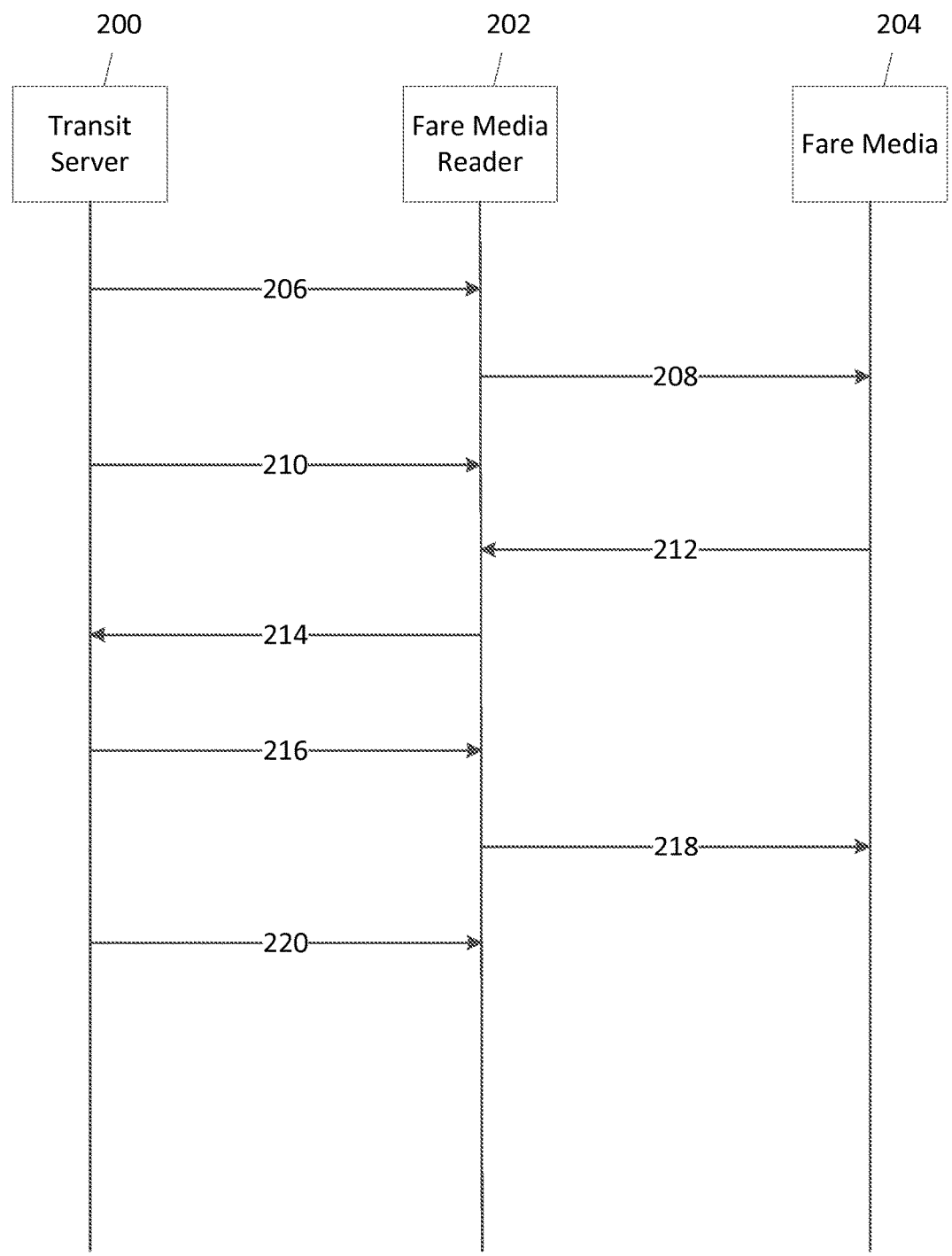
FIG. 2 is a swimlane diagram depicting communications between fare access devices and a remote system over a network according to embodiments.

FIG. 2 shows a swimlane diagram of the interaction of a transit server or other transit system 200, a fare media reader 202, and a fare media 204. The transit system 200, fare media reader 202, and fare media 204 may correspond to the transit system 100, fare media reader 102, and fare media 104 as described in relation to FIG. 1. The transit server 200 may provide a first communication 206 to the fare media reader 202. The first communication 206 may include a risk score and/or one or more lists. A communication 208 including the risk score may be communicated by the fare media reader 202 to the fare media 204. The transit server 200 may also communicate one or more lists 210 to the fare media reader 202. The one or more lists may include positive and/or negative lists, such that the status of a transit account associated with a token received from the fare media 204 may be checked.

The fare media may provide a third communication 212 to the fare media reader. The third communication 212 may include the token associated with the transit account and/or the risk score 206. In cases where the fare media reader 202 is offline and/or the one or more lists are not up to date, the fare media reader 202 may make a determination whether to allow the user access to the transit system based on the risk score 206 received from the fare access media 204. In cases where the fare media reader 202 is online and/or the one or more lists are up to date, the fare media reader 202 may check the token received from the fare media 204 against the one or more lists and determine whether to grant the user access to the transit system based in part on this determination, as well as on the risk score received from the fare media 204 in the third communication 212. The fare media reader 202 may transmit information 214 related to the transit fare media 204 to the transit server 200. The transit server 200 may update a risk score based on the information 214 and communicate an updated risk score 216 to the fare media reader 202. The updated risk score 216 may be transmitted to the fare media 204 by the fare media reader in a fourth communication 218. The transit server 200 may also update the one or more lists based on usage and/or payment history associated with the transit account and provide the updated one or more lists 220 to the fare media reader 202.

Figure 3:
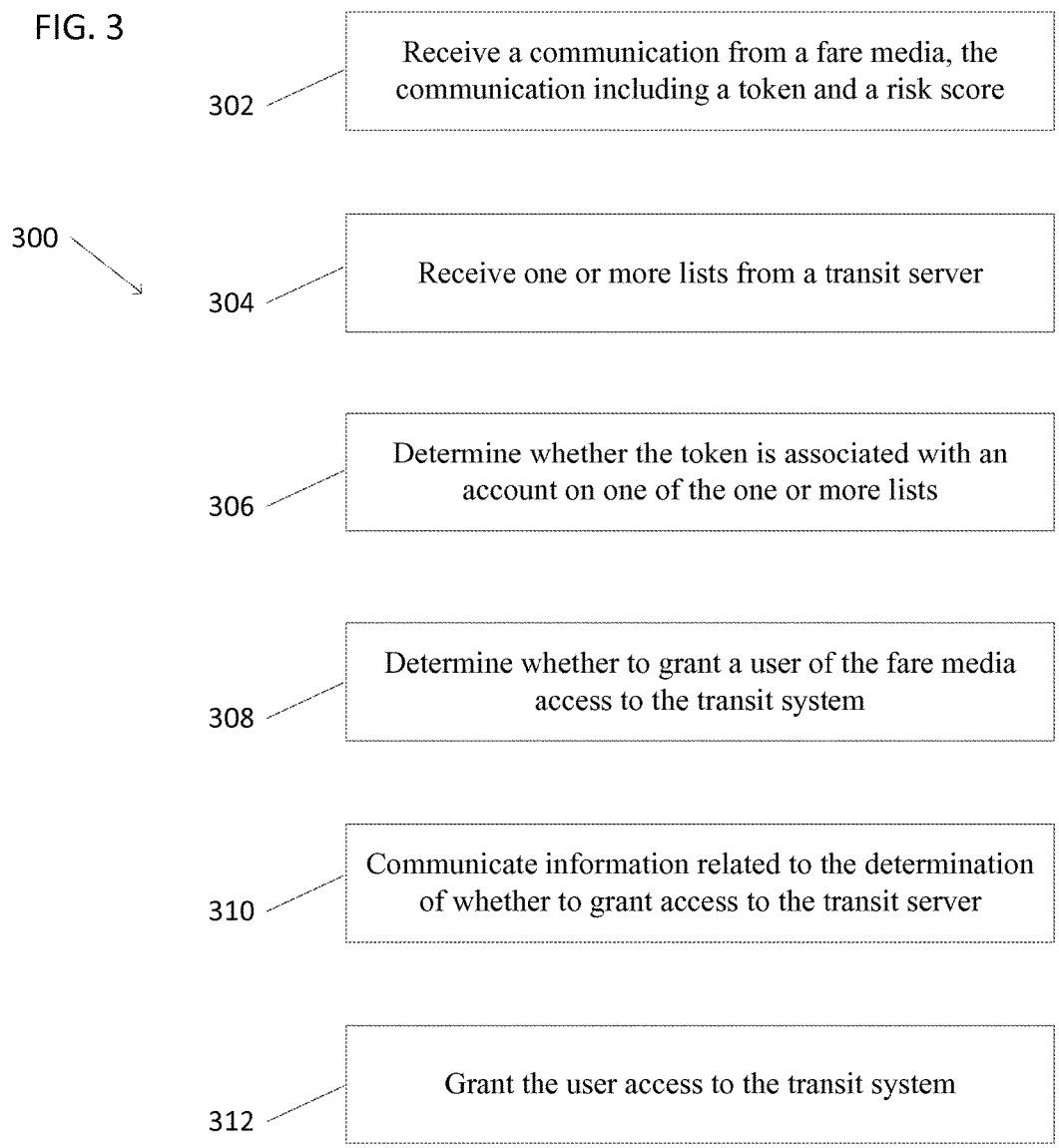
FIG. 3 is a flowchart depicting a process for providing access to a transit system using a fare access media reader.

FIG. 3 depicts a method 300 for providing access to a transit system using a fare access media reader. The method 300 may be conducted by a fare access media reader, such as fare access reader 102 and 202 described in FIGS. 1 and 2 herein. In some embodiments, the method 300 may include receiving a communication from a fare media at 302. The communication may include a token associated with a transit account, as well as a risk score. The risk score may be based on payment and/or usage history of the owner of the transit account associated with the token. At 304, one or more lists may be received from a transit server. For example, the one or more lists may include a positive list and/or a negative list. A negative list may include a transit account identifiers associated with transit accounts in poor standing such as accounts where the transit account has been underfunded, there is a history of late or non-payment, and/or other negative behaviors. A positive list may include transit account identifiers associated with transit accounts where there is a good and/or longstanding history of payment. At 306, a determination made be made as to whether the token is associated with an account on one of the one or more lists received from the transit server. A determination of whether to grant access into the transit system to the user of the fare media may be made at 308.

In some embodiments, the method 300 may include determining whether the one or more lists are up to date. If the lists are up to date, the determination of whether to grant access may be based at least in part on both the risk score and the determination of the association of the token with an account on one of the lists. If the lists are not up to date, the determination of whether to grant access may be based at least in part on the risk score, as the one or more lists may be deemed unfit for use. If the fare media reader is online or otherwise communicatively connected to the transit server, a request for updated versions of the one or more lists may be communicated to the transit server that may be used to further enhance the decision making process. Information related to the determination of whether to grant access into the transit system may be communicated to the transit server at 310. Access to the transit system may be granted to the user of the fare media at 312. In some embodiments, the method 300 may further include receiving an updated version of at least one of the one or more lists. The updated lists may be updated based at least in part on the information received from the fare media. The method 300 may also include receiving an updated risk score that has been updated by the transit server based in part on the information received from the fare media. The updated risk score and/or lists may be used in current and/or subsequent access decisions. The fare media reader may communicate the updated risk score to the fare media. In some embodiments, the transit server may provide the updated risk score directly to the fare media. For example, the fare media may be a mobile device and a private wireless network may be used to communicate the risk score from the transit server to the fare media. For mobile phones acting as fare media, a mobile application may be used to interact with the transit server and/or the transit fare reader. The application and/or information associated with the application may be updated by either the transit server or the fare media reader to provide the updated risk score to the mobile phone.

In some embodiments, the method 300 may include preventing exit from the transit system based at least in part on the risk score. For example, some transit systems do not have gates at the entrances and are easy to access without swiping a fare media. Instead, many of these systems have gate positioned near an exit of the transit system. A user may swipe the fare media at the exit gate. This exit swipe may be used for fare calculation and collection purposes. If a user's token is on a negative list and/or the risk score associated with the transit account and/or the fare media is too low, the exit gate may prevent the user from exiting the transit system. The user may then be prompted to remedy the issue or issues that caused the risk score to be low and/or the account to be placed on a negative list prior to being allowed to exit the transit system.

Figure 4:
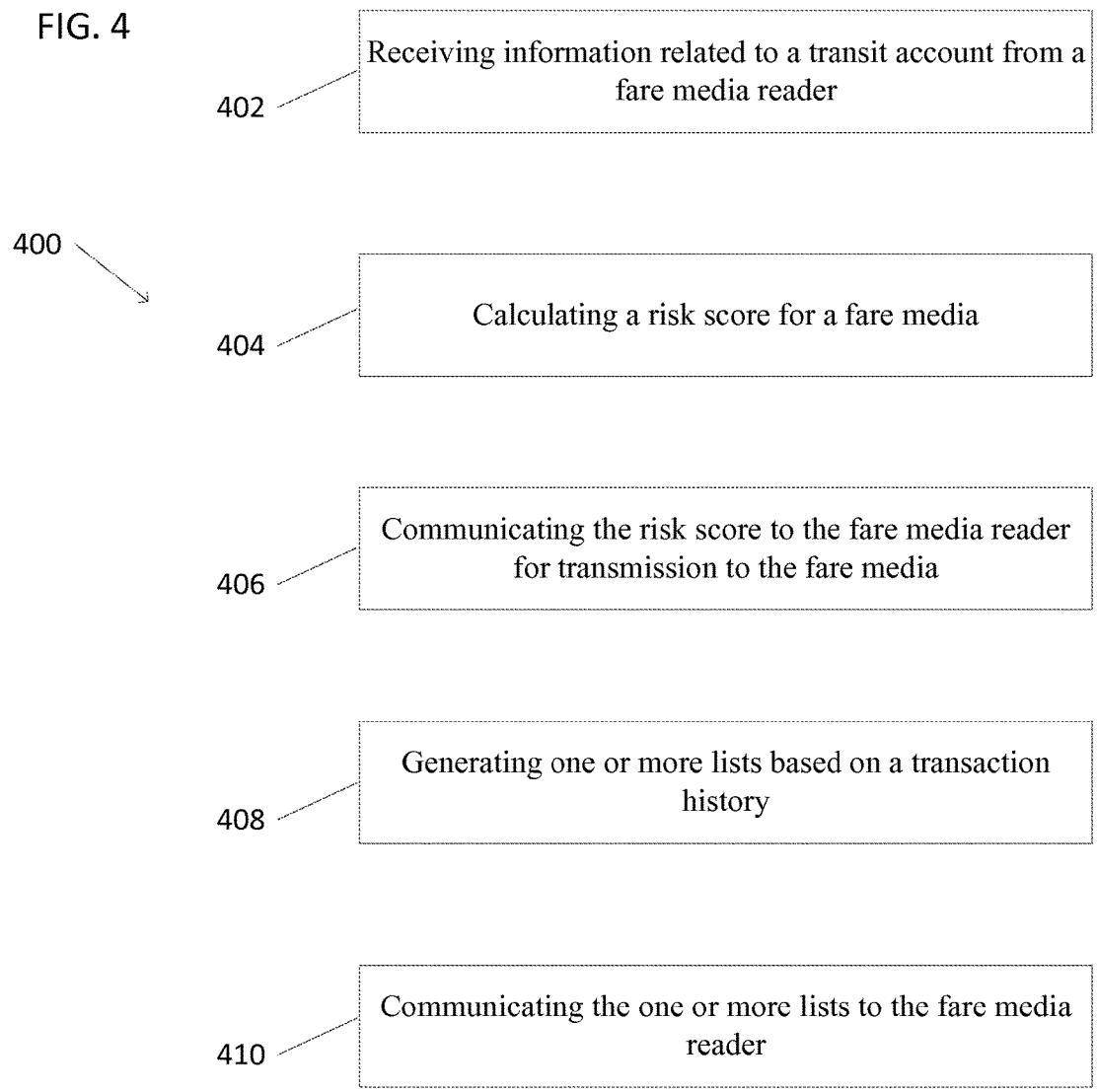
FIG. 4 is a flowchart depicting a process for providing access to a transit system.

FIG. 4 depicts a method 400 for providing access to a transit system using a fare access media reader. The method 400 may be conducted by a transit server, such as transit server 100 and 200 described in FIGS. 1 and 2 herein. In some embodiments, the method 400 may include receiving information related to a transit account from a fare media reader, such as fare media reader 102 and 202 described in FIGS. 1 and 2 herein. Oftentimes, the information related to a transit account may include a token or other identifier associated with the transit account. The token may be received by the fare media reader from a fare media. For example, the fare media may be a card or mobile device that communicates the token and/or a risk score to the fare media reader upon a user trying to enter the transit system. The token may be communicated using NFC, Bluetooth™, radio frequency ID (RFID) and/or other communications protocols. The method 400 may also include calculating a risk score for a fare media at 404. The risk score may be communicated to the fare media reader for transmission to the fare media at 406. At 408, one or more lists may be generated based on a payment, transaction, and/or usage history of the transit account associated with the token received by the transit server. The one or more lists may be communicated to the fare media reader at 410. Based on information received from the fare media reader, the risk score and/or one or more lists may be updated by the transit server and communicated to the fare media reader and/or the fare media, either in real-time, or at a later time.

Figure 5:
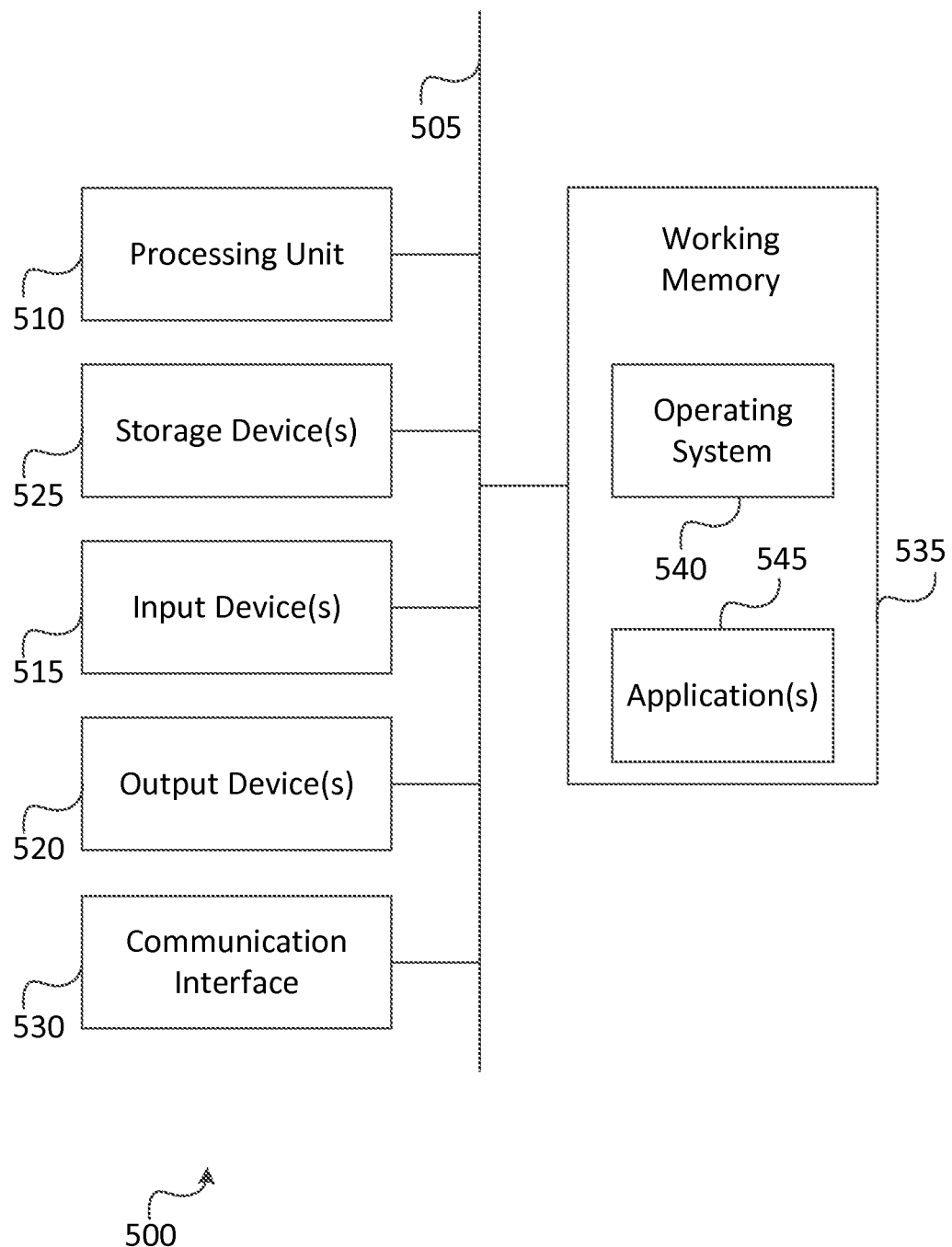
FIG. 5 is a block diagram of an example computing system according to embodiments.

A computer system as illustrated in FIG. 5 may be incorporated as part of the previously described computerized devices. For example, computer system 500 can represent some of the components of the transit server 100, fare media readers 102, and/or fare media 104 of FIG. 1, as well as transit server 200, fare media readers 202, fare media 204 of FIG. 2. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for providing access to a transit system using a fare access media reader, the method comprising:
   communicating, at a first fare access device, a risk score to a fare media at a time when the first fare access device is in an online state;
   receiving, at a second fare access device, one or more lists from a transit server, the one or more lists including a positive list, a negative list, or both, wherein the positive list comprises a first plurality of account identifiers associated with transit accounts in good standing, and wherein the negative list comprises a second plurality of account identifiers associated with transit accounts in poor standing;
   receiving, at the second fare access device, communication from the fare media, wherein the communication comprises a token and the risk score from the fare media, wherein the token is associated with a transit account of the transit system, wherein:
   the risk score is indicative of a likelihood of default associated with the transit account;
   the risk score is generated by the transit server;
   the risk score comprises a single numerical value falling on a scale between two predetermined extreme values;
   the risk score is calculated based on a combination of a usage history of the transit account, a payment history of the transit account, an account balance history of the transit account, a duration of ownership of the transit account, and a history of negative interactions with a fare inspector associated with the transit account;
   the scale comprises a first threshold such that when the risk score is equal to or exceeds the first threshold, a level of risk of nonpayment is sufficiently low that the risk score overweighs the transit account being associated with the negative list and a determination whether to grant a user of the fare media access to or from the transit system is based only on the risk score; and
   the scale comprises a second threshold such that when the risk score is equal to or exceeds the second threshold but is below the first threshold the level of risk of nonpayment is acceptable such that the determination whether to grant the user of the fare media access to or from the transit system is based on both the risk score and a determination of whether the transit account is associated with the negative list or the positive list to determine whether to grant the user access to or from the transit system;
   determining that the second fare access device is in an offline state and cannot receive updated lists;
   determining that the risk score should be a sole indicator by which to determine whether to grant the user of the fare media access to or from the transit system based on the determination that the second fare access device is in an offline state and cannot receive updated lists;
   determining, at the second fare access device, using the risk score, whether to grant the user of the fare media access to or from the transit system;
   communicating, at the second fare access device, to the transit server information related to the determination of whether to grant access; and
   in response to the determination of whether to grant access, granting, by the second fare access device, the user access to or from the transit system.

2. The method for providing access to a transit system using a fare access media reader according to claim 1, further comprising:
   receiving an updated version of the one or more lists, wherein the updated version is updated by the transit server based at least in part on the information.

3. The method for providing access to a transit system using a fare access media reader according to claim 1, wherein:
   the calculation of the risk score is further based on repeated abnormal usage patterns of the transit account.

4. The method for providing access to a transit system using a fare access media reader according to claim 1, wherein:
   the first fare access device and the second fare access device are the same access device.

5. A non-transitory computer-readable medium having instructions embedded thereon for providing access to a transit system, the instructions comprising computer code for causing a computing device to:
   communicate, at a first fare access device, a risk score to a fare media at a time when the first fare access device is in an online state;
   receive, at a second fare access device, one or more lists from a transit server, the one or more lists including a positive list, a negative list, or both, wherein the positive list comprises a first plurality of account identifiers associated with transit accounts in good standing, and wherein the negative list comprises a second plurality of account identifiers associated with transit accounts in poor standing;
   receive, at the second fare access device, a communication from the fare media, wherein the communication comprises a token and the risk score from the fare media, wherein the token is associated with a transit account of the transit system, wherein:
   the risk score is indicative of a likelihood of default associated with the transit account;
   the risk score is generated by the transit server:
   the risk score comprises a single numerical value falling on a scale between two predetermined extreme values;
   the risk score is calculated based on a combination of a usage history of the transit account, a payment history of the transit account, an account balance history of the transit account, a duration of ownership of the transit account, and a history of negative interactions with a fare inspector associated with the transit account;

the scale comprises a first threshold such that when the risk score is equal to or exceeds the first threshold, a level of risk of nonpayment is sufficiently low that the risk score overweighs the transit account being associated with the negative list and a determination whether to grant a user of the fare media access to or from the transit system is based only on the risk score; and the scale comprises a second threshold such that when the risk score is equal to or exceeds the second threshold but is below the first threshold the level of risk of nonpayment is acceptable such that the determination whether to grant the user of the fare media access to or from the transit system is based on both the risk score and a determination of whether the transit account is associated with the negative list or the positive list to determine whether to grant the user access to or from the transit system;

determine that
the second fare access device is in an offline state and cannot receive updated lists;

determine that the risk score should be a sole indicator by which to determine whether to grant the user of the fare media access to or from the transit system based on the determination that the second fare access device is in an offline state and cannot receive updated lists;

determine, at the second fare access device, using the risk score, whether to grant the user of the fare media access to or from the transit system;

communicate, at the second fare access device, information related to the determination of whether to grant access to the transit server; and in response to the determination of whether to grant access, grant, by the second fare access device, the user access to the transit system.

6. The non-transitory computer-readable medium of claim 5, further comprising instructions for causing the computing device to:
receive an updated version of the one or more lists, wherein the updated version is updated by the transit server based at least in part on the information.

7. The non-transitory computer-readable medium of claim 5, wherein:
the calculation of the risk score is further based on repeated abnormal usage patterns of the transit account.

8. A fare access device, comprising:
a communications interface configured to send and receive data;
a memory; and
a processor configured to:
communicate a risk score to a fare media at a time when the fare access device is in an online state;
receive, at the fare access device, using the communication interface, one or more lists from a transit server, the one or more lists including a positive list, a negative list, or both, wherein the positive list comprises a first plurality of account identifiers associated with transit accounts in good standing, and wherein the negative list comprises a second plurality of account identifiers associated with transit accounts in poor standing;
receive, at a second time, using the communication interface, a communication from the fare media, wherein the communication comprises a token and the risk score from the fare media, wherein the token is associated with a transit account of a transit system, wherein:
the risk score is indicative of a likelihood of default associated with the transit account;
the risk score is generated by the transit server:
the risk score comprises a single numerical value falling on a scale between two predetermined extreme values;
the risk score is calculated based on a combination of a usage history of the transit account, a payment history of the transit account, an account balance history of the transit account, a duration of ownership of the transit account, and a history of negative interactions with a fare inspector associated with the transit account;
the scale comprises a first threshold such that when the risk score is equal to or exceeds the first threshold, a level of risk of nonpayment is sufficiently low that the risk score overweighs the transit account being associated with the negative list and a determination whether to grant a user of the fare media access to the transit system is based only on the risk score; and
the scale comprises a second threshold such that when the risk score is equal to or exceeds the second threshold but is below the first threshold the level of risk of nonpayment is acceptable such that the determination whether to grant the user of the fare media access to or from the transit system is based on both the risk score and a determination of whether the transit account is associated with the negative list or the positive list to determine whether to grant the user access to or from the transit system;

determine that
the fare access device is in an offline state and cannot receive updated lists;
determine that the risk score should be a sole indicator by which to determine whether to grant the user of the fare media access to or from the transit system based on the determination that the fare access device is in an offline state and cannot receive updated lists;
determine, at the fare access device, using the risk score, whether to grant the user of the fare media access to or from the transit system;
communicate, at the fare access device, using the communication interface, information related to the determination of whether to grant access to the transit server; and
in response to the determination of whether to grant access, grant, by the fare access device, the user access to or from the transit system.

9. The fare media reader according to claim 8, wherein the processor is further configured to:
receive an updated version of the one or more lists, wherein the updated version is updated by the transit server based at least in part on the information.

10. The fare media reader according to claim 8, wherein:
the calculation of the risk score is further based on repeated abnormal usage patterns of the transit account.

* * * * *